Oct. 30, 1945.    W. C. WAGNER    2,387,816
ILLUMINATING DEVICE
Filed Feb. 25, 1943    2 Sheets—Sheet 1
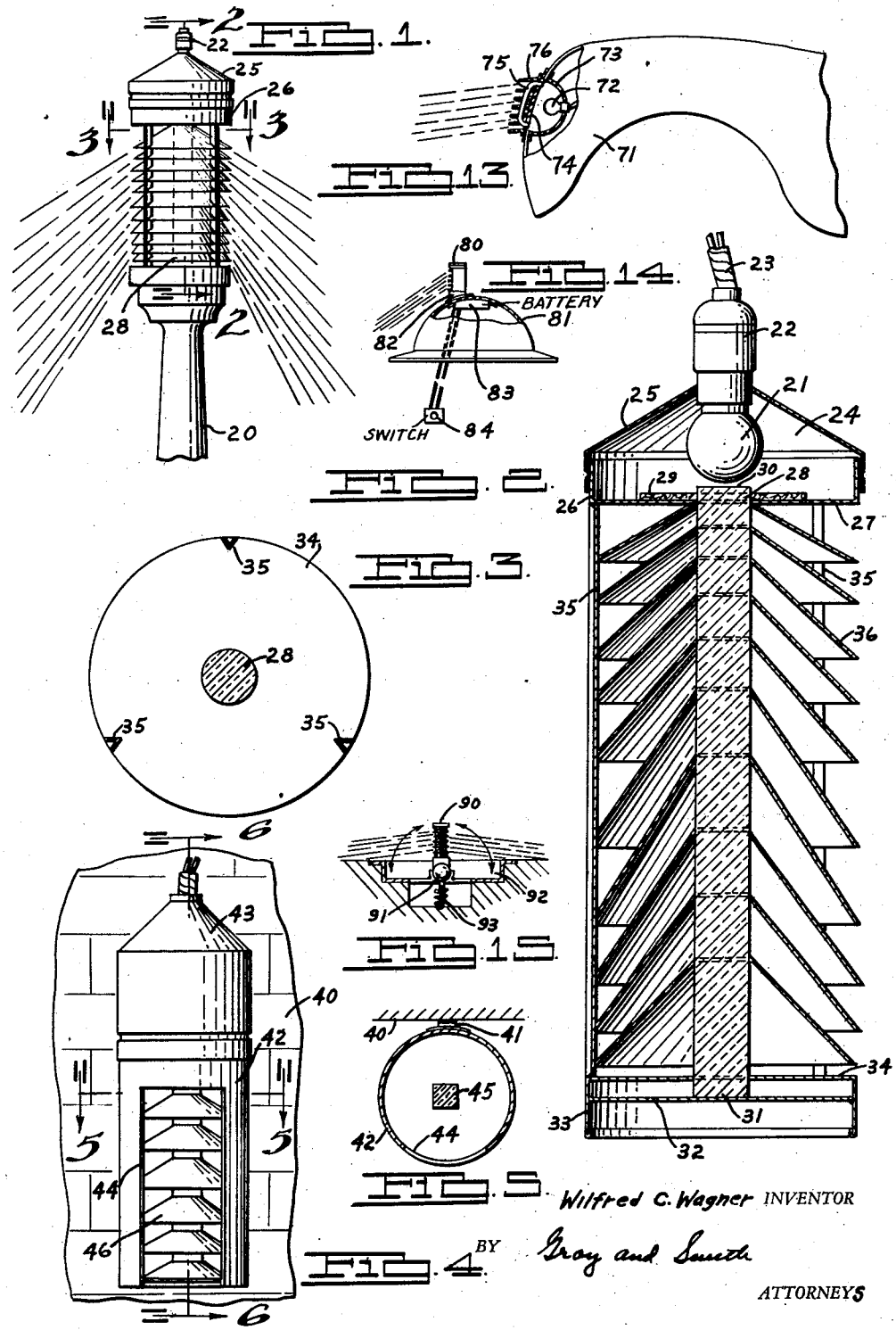
Wilfred C. Wagner INVENTOR
BY Gray and Smith
ATTORNEYS Oct. 30, 1945.  W. C. WAGNER  2,387,816
ILLUMINATING DEVICE
Filed Feb. 25, 1943  2 Sheets-Sheet 2
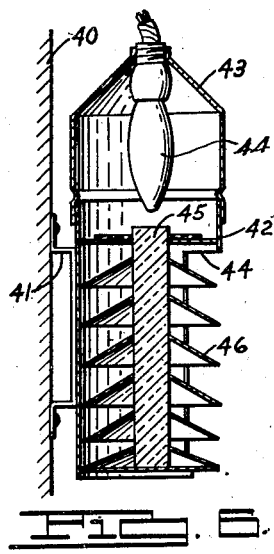
FIG. 6.
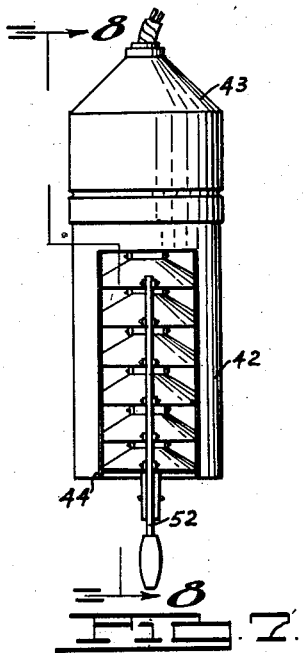
FIG. 7.
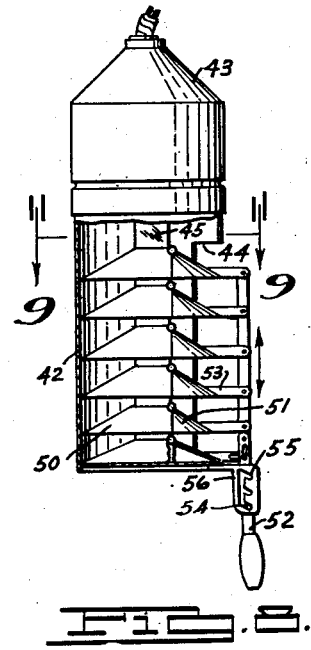
FIG. 8.
FIG. 9.
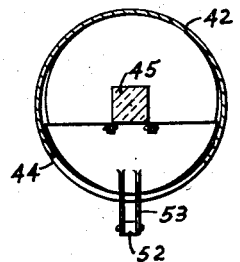
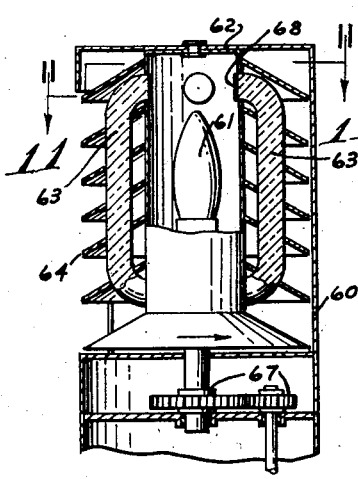
FIG. 10.
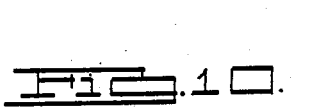
FIG. 11.
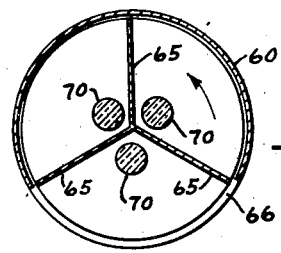
FIG. 12.
Wilfred C. Wagner INVENTOR
BY Gray and Smith
ATTORNEYS Patented Oct. 30, 1945

2,387,816

UNITED STATES PATENT OFFICE 2,387,816

ILLUMINATING DEVICE

Wilfred C. Wagner, Detroit, Mich.

Application February 25, 1943, Serial No. 477,044

4 Claims. (Cl. 177—329)

The present invention relates to an illuminating device and more particularly to an illuminating device in which the dissemination of light from an enclosed lamp is controlled to provide illumination only of preselected areas. The device is particularly but not exclusively adapted for use in "blackouts" since the light emanating from this device is both diffused and shielded so as to illuminate only a preselected area without dissemination of light rays into planes outside of said selected area.

One of the objects of the present invention is to provide an illuminating device adapted to provide a diffused illumination of a predetermined area within selected horizontal and vertical limits and in which the lamp is fully shielded to prevent dissemination of directional light rays, all illumination being provided by a light diffusing and distributing member.

It is a further object of the present invention to provide a novel illuminating device which may be selectively controlled to provide a diffused illumination of selected area within predetermined horizontal and vertical planes and in which a plastic light diffusing member is provided with adjustable shielding members to control the distribution of the diffused light over the selected and predetermined area.

It is a further object of the present invention to provide an illuminating device particularly, but not exclusively, adapted for use as a signaling device during "blackouts," the device being adapted for use either as a fixed or a movable signal to provide illumination only within a restricted area having predetermined horizontal and vertical limits.

The device of the present invention is particularly adapted, because of its structure and functions, to be used as a marking, warning, safety or signaling device during "blackouts" since the device provides a controlled diffused illumination only within predetermined horizontal and vertical limits of a preselected area to be illuminated. The device avoids dissemination of all directional light rays and shields the diffused rays to prevent dissemination thereof into planes lying outside of the vertical and horizontal limits of the preselected area to be illuminated. The illuminating rays are so directed as not to be visible outside the desired area of illumination and are so diffused that they cannot be reflected into planes outside the desired area by reflecting surfaces within the desired area.

The present invention is shown in its preferred embodiment and several modifications thereof in the accompanying drawings forming a part of this application and in which:

Fig. 1 is a side elevation of a device of the present invention mounted on the top of a fixed object, such for example as a post, which is shown in fragmentary elevation.

Fig. 2 is a vertical section taken substantially on the line 2—2 looking in the direction of the arrows of Fig. 1.

Fig. 3 is a cross section taken substantially on line 3—3 in the direction of the arrows in Fig. 1.

Fig. 4 is an elevation of a modified form of an illuminated device embodying the present invention mounted on a portion of a wall, which is shown in fragmentary elevation.

Fig. 5 is a cross section taken substantially on the line 5—5 in the direction of the arrows in Fig. 4.

Fig. 6 is a vertical section taken substantially on the line 6—6 in the direction of the arrows of Fig. 4.

Fig. 7 is an elevation of a modified form of the device of the present invention.

Fig. 8 is a broken-away view partly in section taken substantially on the line 8—8 in the direction of the arrows in Fig. 7.

Fig. 9 is a cross section taken substantially on the line 9—9 in the direction of the arrows in Fig. 8.

Fig. 10 is a side elevation with parts broken away and parts shown in section of a modified form of the device of the present invention.

Fig. 11 is a section taken substantially on the staggered line 11—11 in the direction of the arrows in Fig. 10.

Fig. 12 is a view similar to Fig. 11 showing a modified form of the device embodying the present invention.

Fig. 13 is a side elevation with parts broken away and partially in section and showing a device embodying the present invention adapted for use as a vehicle headlight.

Fig. 14 is a side elevation with parts broken away and partially in section of a device of the present invention adapted for use on a helmet or other head-gear.

Fig. 15 is a side elevation partially in section showing the device of the present invention adapted for use as a surface marking device.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, there is shown by way of example in Fig. 1 an illuminating device of the present invention which is mounted on a fixed object, such for example as a post 20. The illuminating device of the present invention, as shown in Figs. 1 and 2, comprises a light source 21, such for example as an incandescent electric light bulb, which is electrically connected through a socket 22 and an electric conduit 23 with a source of electric energy. The light source 21 is completely enclosed within the chamber 24 which is formed by the removable cap member 25 and the member 26 which is removably secured thereto and which has an enclosed bottom portion 27 through which extends the light diffusing member 28. A flexible sealing member 29 is secured to the bottom of the member 26 and is tightly secured around the sides of the light diffusing member 28 to prevent any leakage of direct light rays from the chamber 24. The light diffusing member 28 is provided with a polished surface 30 adjacent the source of illumination so that light from the source of illumination 21 is transmitted into the body of the member 28. The member 28 is formed of any suitable light transmitting and diffusing plastic, such for example as a rod of polystyrene or polyvinyl resins which are available commercially under various names. Such compounds possess the property of transmitting light through an elongated path and normally would cause a transmission of light through the end 31 which is opposite to the polished end 30.

As shown in Fig. 2, transmission of light through the end 31 is prevented by the member 32 which extends entirely across the end of the member 28 and forms an integral part of the base portion 33 of the illuminating device of the present invention. In order to hold the light diffusing member in its desired position, the top portion 34 of the base 33 is provided with an opening to receive the plastic member 28 and hold it between said member and the member 32. By this means the light from the source 21 is confined entirely within the plastic member 28 and causes it to glow with an appearance resembling the phenomena of phosphorescence. The amount of illumination which is transmitted from the plastic member may be controlled by varying the intensity of light at its source and by varying the length and the side surfaces of the plastic member. The said side surfaces may be highly polished, in which event a substantial amount of illumination will be provided, or the sides may be scarified to provide a frosted appearance in which event less illumination is given off by said member. Regardless of the amount of illumination to be provided through the member by variations on the side surfaces thereof, the illumination in every instance consists of diffused light rays which the member has transmitted from the source of illumination 21. The amount of illumination given off by the member 28 depends also on its length. The vertical height of the illuminating device of the present invention is controlled in part by this factor.

The bottom of the device 33 is spaced from the top chamber 24 and is secured thereto by a plurality of vertically extending members 35 each secured at one end to the plate 34 and at their opposite ends to the plate 27. Surrounding the plastic member 28 are a plurality of baffles 36 which, as shown in Fig. 2, may be deflected at various angles when it is desired to illuminate a surface area within fixed boundaries. As shown in Fig. 2, the top baffle may be arranged so as to shield and deflect the illumination over a wider area than, for example, one of the baffle members 36 adjacent the lower end of the member 28. It is to be understood, however, that it is not essential to the present invention that the baffles 36 be so arranged, they may instead be so arranged that all extend at substantially the same angle. However, it is preferred where the device is to be mounted as shown in Fig. 1 on top of a fixed member such as the post 20 that the baffles 36 be arranged so as to permit illumination only of the predetermined area and cut off all visibility of the illumination from any point outside of such area.

From the foregoing it will be seen that the illuminating device of the present invention comprises essentially the source of illumination 21 which is disposed within the chamber 24 in which provision is made to prevent the escape of any light rays except through the plastic member 28 and that the plastic member 28 acts to transmit a diffused light from the source 21. The plastic member 28 is caused to glow and to provide a highly diffused illumination throughout its entire length. The baffle means 36 are designed to cut off any view of the glowing plastic member except from predetermined positions. In the structure shown in Figs. 1, 2 and 3, it will be seen that the glow of the plastic member cannot be observed from a vertical plane above the top of the device.

The modified form of device embodying the present invention as shown in Figs. 4, 5 and 6 is particularly adapted for mounting on a wall or similar surface 40 to which is secured the bracket 41 which carries the device of the present invention. The modified construction operates in the same manner as that previously described in connection with the construction shown in Figs. 1 and 2 but varies in certain structural details. In this embodiment of the invention, an enclosed body portion 42 is provided with a top cap 43 in which is provided the source of illumination 44a, such for example as an incandescent electric bulb suitably connected with a source of electric energy. A vertical opening 44 is provided in the enclosed body portion 42 along one side of and adjacent to a plastic light transmitting member 45. Thus, the body portion 42 cuts off any view of the glowing of the plastic light transmitting member 45 except as it may be seen through the cut away portion 44.

A device of the modified form shown in Figs. 4, 5 and 6 is therefore particularly adapted for mounting on a wall or similar structure where it is desired to restrict the visibility of the glowing member to a segment of the whole arc of illumination which would be provided in a construction such as that shown in Figs. 1, 2 and 3.

As shown in Fig. 5 the plastic light transmitting member 45 in this construction is preferably square or rectangular in contour with one of the flat faces disposed adjacent the opening 44.

A plurality of baffles 46 may be provided as shown which extend completely around the plastic member 45 and have a projecting portion extending through the opening 44. It will be understood, however, that the opening 44 may be formed with suitable louvers or baffles which will extend across the opening and serve to cut off a view of the illuminating element from points above the plane of the top baffle member.

In the construction shown in Figs. 7, 8 and 9 an illuminating device embodying the present invention which is generally similar to that found in Figs. 4, 5 and 6 is disclosed. The same reference numerals are employed where they correspond to parts similar to those heretofore described in the modifications shown in Figs. 4, 5 and 6. In the construction here illustrated, baffle members 50 are employed and each extends around the light transmitting plastic member 45 and each is provided with a hinged portion 51 which extends into the opening 44. A suitable member, such for example as the manually operated device 52, is connected by links 53 with each of the hinged portions 51 of the baffles 50. Movement of the manually actuated member 52 as indicated by the arrow is transmitted through the links 53 to the hinged portions 51 of the baffle members so that the hinged portions may be moved into any one of a plurality of selected positions.

As shown in Fig. 8, the manually actuated device 52 may be provided with a latching pin 54 which may seat in a slot 55 in the bracket 56 and hold the manually actuated device in any desired preselected position and thus hold the hinged portions 51 of the baffles 50 in the desired adjusted position. Such an illuminating device as that shown in Figs. 7, 8 and 9 would be useful as a signaling device as it would permit the transmission of glowing signals without illuminating areas outside of the desired preselected areas into which the signals are intended to be seen. Also by latching the manually operable member 52 in any preselected position it is possible to control the vertical plane from which the illuminated member may be seen. If desired, however, other forms of baffle and shutter members may be employed, as for example pivotally mounted or hinged louvers may be formed as an integral part of the housing 42 and extend across the opening 44 and these members may be moved by any desired means. Thus, a device as shown in Figs. 7, 8 and 9 would be particularly adaptable for use as a running or signal light for use on ships, particularly those moving in a convoy. By constructing the baffles so that in a predetermined position the light is visible over a restricted area it would be possible for one ship to observe the position of another ship in the convoy even though all of the usual running lights were extinguished. In order to prevent detection of the light source from the air, the baffle members would be arranged preferably so as to prevent detection from a vertical plane above the illuminating device. In the event of a submarine attack where it would be desired to cut off a view of the illuminating element from a point below the baffles, the movable baffles could be adjusted so as to cut off a view of the illuminating element from a plane below the device. The movement of the movable portions of the baffles would have the effect of permitting a view of the illuminating element only from predetermined positions and for predetermined time intervals and thus by movement of the baffles, visible signals can be given without the transmission of light to points in space lying outside of a preselected area.

A further modification of the present invention is shown in Figs. 10 and 11 which shows the adaptation of the device for use as a warning signal of the blinker or intermittent type. In the construction here shown, the illuminating device is mounted in a stationary housing 60 which may be affixed to a vehicle such as an ambulance or the like or which may be affixed to any point where an intermittent warning is desired. The illumination is provided from a suitable source 61 which may be, as here shown, an incandescent electric lamp suitably connected with a source of electric energy. The source of light 61 is preferably mounted in a fixed position within a rotatable light-tight housing 62 in which is secured a plurality of bent light transmitting plastic member 63. Secured to the members 63 are a plurality of baffles 64 which cut off a view of the illuminated members 63 except from certain selected and predetermined points. The space between the light-tight housing 62 and the inner surface of the housing 60 is divided by radial partition members which divide the space into separate segments through each of which extends one of the illuminating members 63. The housing 60 is provided with an opening 66 which preferably extends from one partition member 65 to the adjacent partition member 65 when the rotating parts are in the position as shown in Fig. 11. The rotating housing 62 carrying the light transmitting members 63, the baffles 64 and the partition 65 is rotatable as a unit relative to the housing 60 and the source of illumination 61. This rotation may be effected in any desired manner, as for example, by the shaft and gearing indicated generally by the numeral 67 in Fig. 10. By rotating this assembly through the shaft and gearing 67 it will be seen that the several light transmitting elements will be brought into position where they may be observed through the window 66 at intermittent intervals and the remainder of the time will be enclosed within the housing 60. The speed of rotation of the rotating elements of the assembly will determine the effect which is secured from this use of the device, for example, if rotating rapidly it will give the appearance of a very rapid or continuous blinking type of signal whereas if rotated more slowly it will give a different type of signal. The effect of this signal may be increased by imparting various colors to the illumination transmitted through the members 63. If desired, this may be accomplished by the use of suitable colored filter members 68 which may be secured to the housing 62 or which may be, as here shown, secured directly on the ends of each of the light transmitting members 63. For example, one of the members 68 could be red, another amber and a third green and thus give the conventional stop, warning and go traffic signals from a single source of illumination. It should be understood, of course, that any desired color scheme may be used and that it may be selected so as to give the desired warning or other signaling effect. It is also to be understood that colored light transmitting members may be used without the color filter members if desired.

In the modification as shown in Fig. 12 a construction is provided which is similar to that shown in Figs. 10 and 11, except that vertically extending light transmitting members 70 are employed and the light source, which is not shown, is similar to that shown in Fig. 1. In the use of this device, as in the use of the forms shown in Figs. 10 and 11, the rotation of the light transmitting member 70 relative to the light source will provide the giving of the desired signals through the opening 66. Because of the different construction employed in Fig. 12, the housing 62 may be dispensed with and the partitions 65 be joined as shown in Fig. 12.

Fig. 13 shows a device of the present invention as applied for use as a motor vehicle "blackout light." As here shown, the device is mounted in a fender 71 or other suitable part of the vehicle, and the light source 72 is enclosed in the light-tight housing 73 which is covered by an opaque plate 74 which carries the bent plastic light transmitting members 75. Suitable baffle elements 76 prevent a view of the members 75 other than from predetermined points in space.

In Fig. 14, the illuminating device of the present invention is indicated by the numeral 80 and is mounted on a head-gear such as a helmet 81. In this instance the light source is in the base portion 82 of the illuminating device 80 and may be a flash light bulb which is supplied with current from a battery 83. The illumination of the device may be turned on or off by the remote control switch 84.

In the construction shown in Fig. 15 the illuminating device of the present invention indicated by the numeral 90 is pivotally mounted with a suitable ball and socket or other swivel type of mounting so that when used as a surface marker, the illuminating device 90 may move in the direction of the arrows into a recessed portion 92 provided in the surface. A spring 93 is employed to return the illuminating device 90 to its vertical position. It is to be understood from the foregoing that the light source may be mounted either above the plastic light transmitting member, as shown in Figs. 2 and 6, or it may be mounted and extend along the light source as shown in Figs. 10 and 13 or the light source may be mounted at the bottom of the unit and transmit the light upwardly through the plastic member as shown in Fig. 15. It is also to be understood in the event a colored illumination is desired in any of the forms of the device herein shown that this may be accomplished either by the use of colored light bulbs, colored plastic light transmission members or the use of colored light filters.

I claim:

1. An illuminating device adapted to provide controlled illumination of a predetermined area and prevent the dissemination of visible rays into adjacent areas, said device comprising an enclosed light source, means for transmitting and diffusing the light therefrom and comprising an elongated plastic member enclosed at each end and communicating with said light source to transmit light therefrom, and spaced baffles associated with said light diffusing member to reflect illumination from said member to a predetermined area of restricted horizontal and vertical dimensions.

2. In an illuminating device as claimed in claim 1 and further characterized in that the plastic light diffusing member has light diffusing and light transmitting surfaces extending substantially through its entire length.

3. In an illuminating device as claimed in claim 1 and further characterized in that the said plastic light transmitting and diffusing member is provided with a polished end surface adjacent said light source to transmit light into the body of said member and is provided with surfaces for the transmission of diffused light extending substantially through the entire length thereof.

4. An illuminating device as claimed in claim 1 and further characterized in that the light diffusing plastic member is provided with a polished end surface adjacent said light source and is adapted to transmit light therefrom into the body of said member, and is provided with surfaces extending substantially through the entire length thereof for dissemination of diffused light, and means for preventing the transmission of light through the opposite end of said plastic member.

WILFRED C. WAGNER.